United States Patent
Patel et al.

(10) Patent No.: US 11,178,079 B1
(45) Date of Patent: Nov. 16, 2021

(54) METHODS AND SYSTEMS FOR TRANSMITTING AN IMAGE WITH THUMBNAIL DATA

(71) Applicant: WhatsApp Inc., Menlo Park, CA (US)

(72) Inventors: Aaron Patel, Menlo Park, CA (US); Jonathan Sheller, San Francisco, CA (US)

(73) Assignee: WHATSAPP LLC, Menlo Park, CA (US)

( * ) Notice: Subject to any disclaimer, the term of this patent is extended or adjusted under 35 U.S.C. 154(b) by 0 days.

(21) Appl. No.: 16/878,883

(22) Filed: May 20, 2020

Related U.S. Application Data

(60) Provisional application No. 62/874,554, filed on Jul. 16, 2019.

(51) Int. Cl.
*H04L 12/58* (2006.01)
*H04L 29/08* (2006.01)
*H04L 9/06* (2006.01)

(52) U.S. Cl.
CPC .......... *H04L 51/043* (2013.01); *H04L 9/0643* (2013.01); *H04L 51/08* (2013.01); *H04L 51/30* (2013.01); *H04L 67/2823* (2013.01)

(58) Field of Classification Search
CPC ....... H04L 51/043; H04L 51/08; H04L 51/30; H04L 9/0643; H04L 67/2823
See application file for complete search history.

(56) References Cited

U.S. PATENT DOCUMENTS

| 2016/0197896 A1* | 7/2016 | Lester | H04L 63/0442 713/150 |
| 2018/0241871 A1* | 8/2018 | Sarafa | H04L 51/26 |
| 2019/0065763 A1* | 2/2019 | Berg | G06F 16/9566 |

* cited by examiner

*Primary Examiner* — Blake J Rubin
(74) *Attorney, Agent, or Firm* — Kacvinsky Daisak Bluni PLLC

(57) ABSTRACT

Exemplary embodiments relate to techniques for improving the speed and rendering quality of an image (e.g., a JPEG), particularly in an end-to-end encrypted environment. The image may be analyzed on the sending-client side and the image data may be broken into a thumbnail and a full-quality image, where the full-quality image data relies on the thumbnail data to render a high-quality image. The image is uploaded to a blob store, and a message is sent to the receiving client with image information. At the recipient side, the JPEG image data is retrieved from the blob store and the thumbnail is first rendered. Subsequently, as the remainder of the image data is received at the receiving client, the image is updated. Consequently, images are rendered faster, and the thumbnail can be automatically downloaded so that a user can determine if they wish to download the full image.

17 Claims, 15 Drawing Sheets

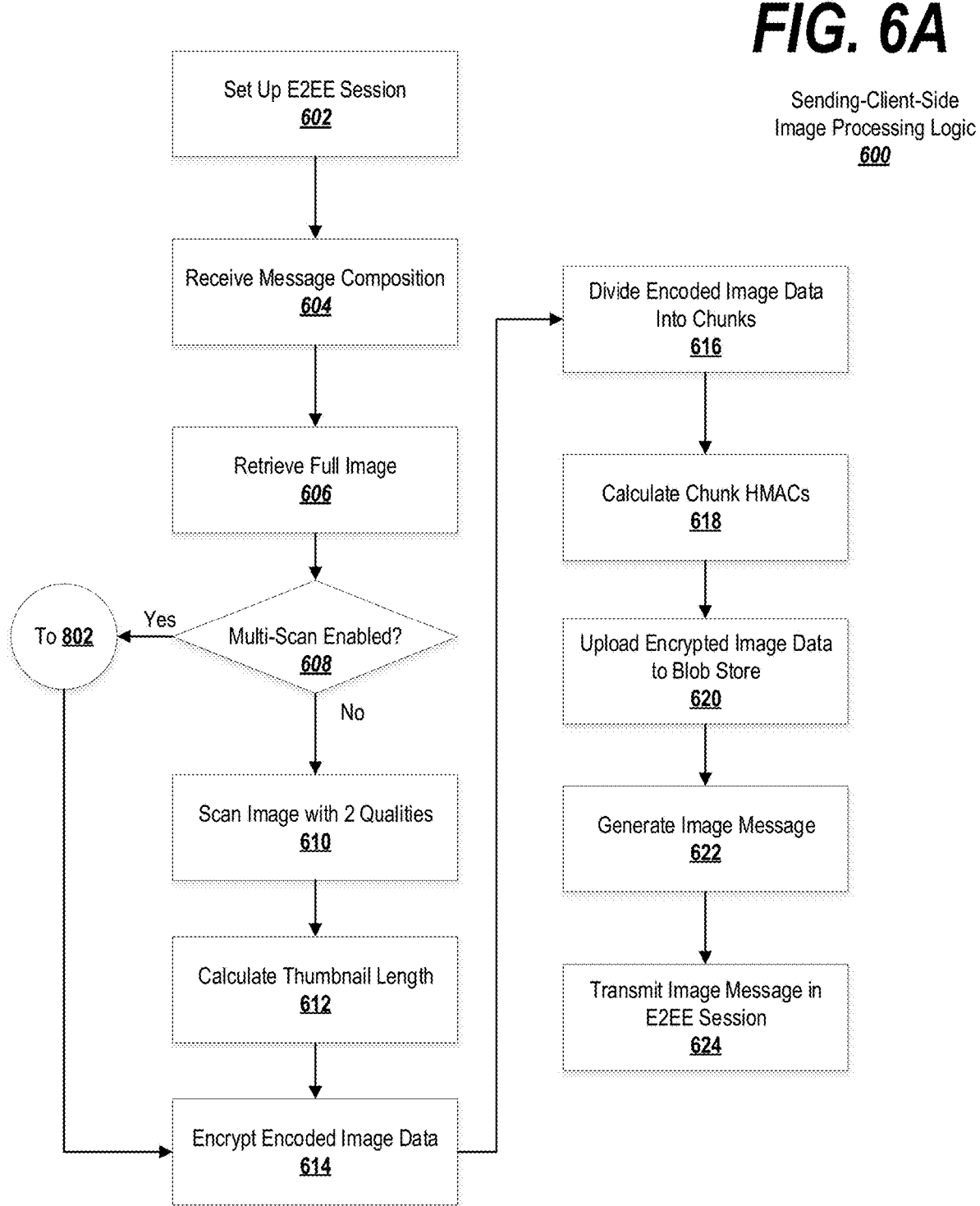

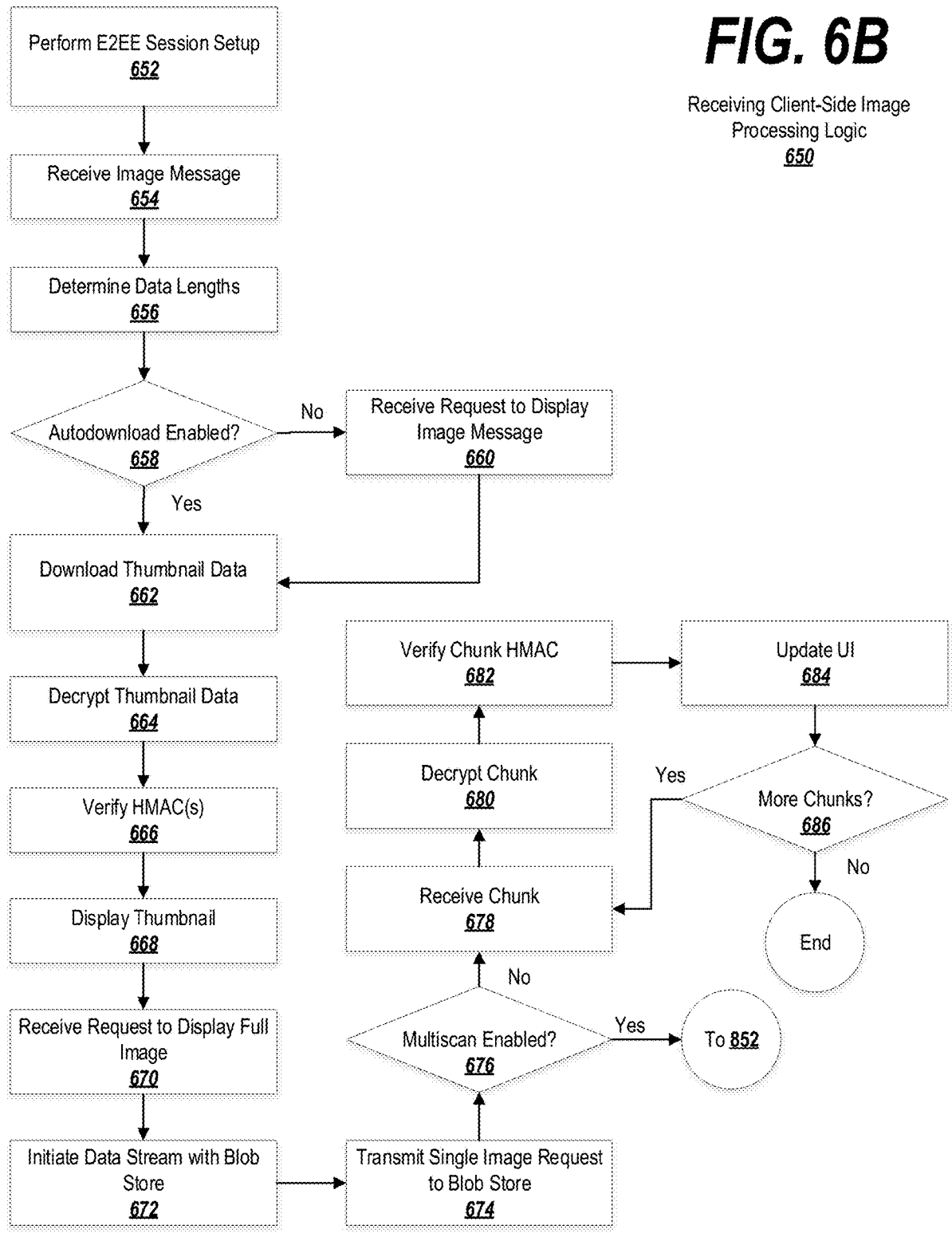

Receiving Client-Side Image Forwarding Logic
690

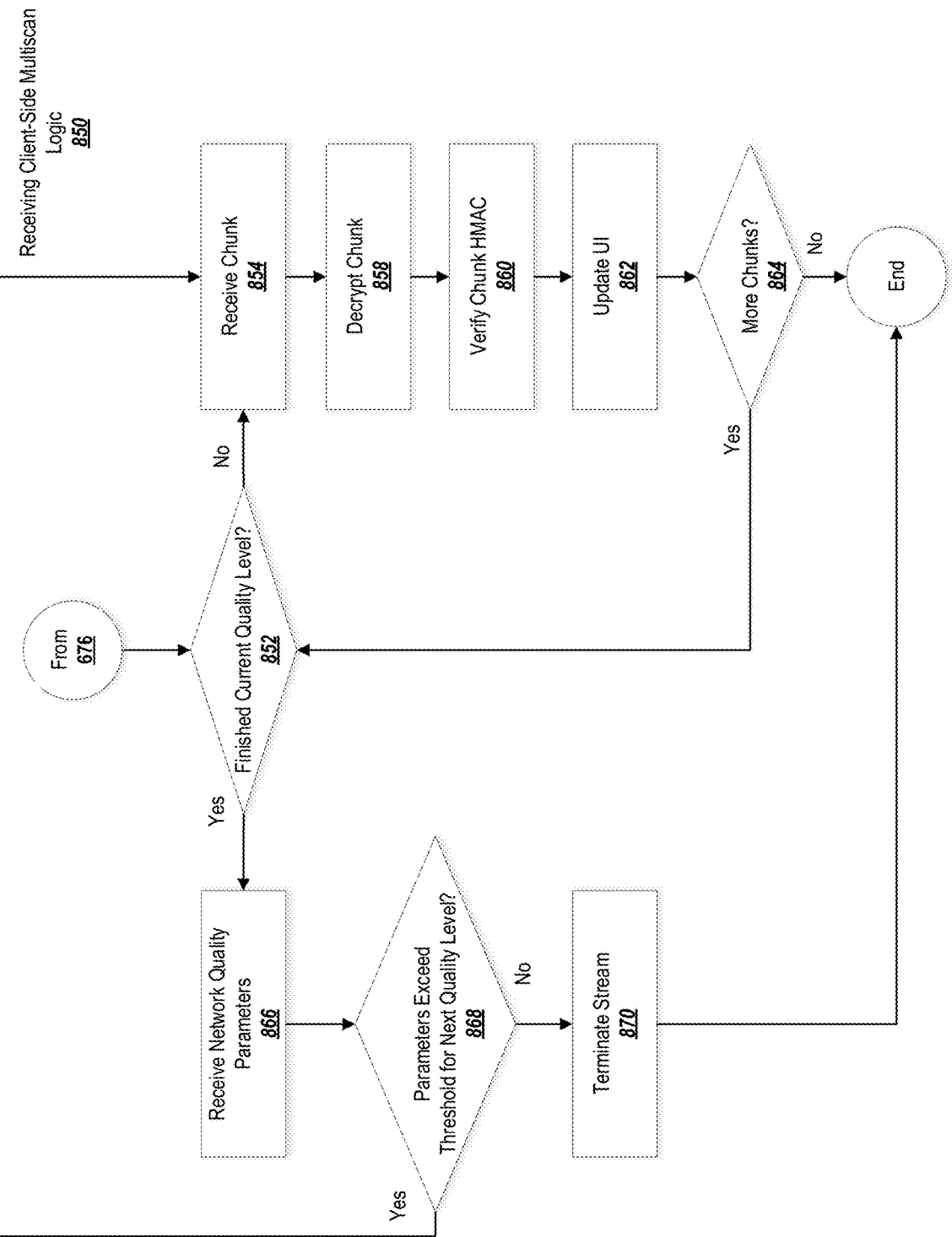

METHODS AND SYSTEMS FOR TRANSMITTING AN IMAGE WITH THUMBNAIL DATA

RELATED APPLICATIONS

This application claims priority to U.S. Provisional Patent Application 62/874,554, filed on Jul. 16, 2019 and entitled "Progressive JPEGs." The contents of the aforementioned application are hereby incorporated by reference.

BACKGROUND

Some communications services, such as messaging services and social networking services, allow users to exchange communications with other users. The communications may include images (such as a JPEG image). Particularly when the image is relatively large in size, it may take some time to be received and loaded on the recipient's device. For instance, a common phenomenon when images are requested over a network is that the top half of an image will initially load after a certain period of time, leaving the bottom half blank. Eventually, when more data is received, the remainder of the image is filled in.

BRIEF DESCRIPTION OF THE DRAWINGS

FIGS. 6A-6B are flowcharts depicting exemplary logic according to the first embodiment for encoding and sending an image from a sending client and receiving and decoding an image at a receiving client, respectively.

FIGS. 8A-8B are flowcharts depicting exemplary logic according to the second embodiment for encoding and sending an image from a sending client and receiving and decoding an image at a receiving client, respectively.

DETAILED DESCRIPTION

Figure 1A:
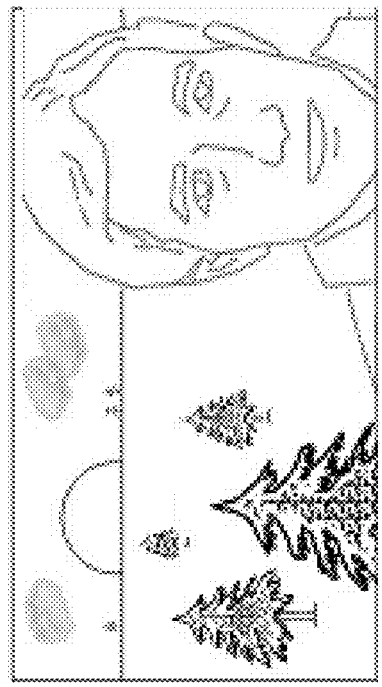
FIGS. 1A-1E depict the same image at varying levels of quality, according to an embodiment.

Often in a network, images such as JPEGs will load from top-to-bottom as data is received. This is often due to the fact that such images are typically packetized and transmitted from a beginning to an end of the image data structure, meaning that the image data making up the first part of the image is completely transmitted before the image data making up subsequent parts of the image. Consequently, while the image is being loaded the user may not have a particularly good sense of the image, since no image data from the bottom portion of the image is initially available.

To address this issue, some communication networks allow their users to automatically download images as communications including the images are received. In this way, the user can be provided with quick access to the full-quality version of the image if they do not open the message including the image right away. Problematically, in many cases a user does not ever view the downloaded image, meaning the network bandwidth used to transmit this message was wasted.

Another potential solution is to create a smaller "thumbnail" of the image. A user can view the thumbnail to get a preview of what the image will look like, and then may select the thumbnail to download the full-size image. This solution allows a user to preview the entire image and also has the advantage that, if a user does not wish to download the full image, the amount of information transmitted on the network can be reduced. If the user views the preview and decides that they do not wish to download the entire image, they can refrain from doing so and avoid the need to transmit the fully-quality image—only the smaller thumbnail has been sent in this scenario. Unfortunately, if a user does wish to download the entire image, using a thumbnail in this way actually increases the total amount of data transmitted on the network, since both the full-quality image and the smaller thumbnail need to be downloaded. Moreover, when the full-size image is loaded it may still load from top-to-bottom. Thus, the use of a conventional thumbnail does not address the problem of having the full-size image load incrementally.

Another potential solution is to use a progressive JPEG. When an image is transmitted over a network, typically the full image is uploaded to an intermediate server facilitating the transfer. The intermediate server scans the image multiple times, using appropriate transcoding parameters, to generate multiple versions of the image data. When these versions are transmitted to a recipient, the recipient can render them in a manner that is blurry at first, and then progressively becomes clearer. This is an improvement over the top-to-bottom approach of non-progressive JPEGs.

However, progressive JPEG transmission generally rely on the intermediate server to process the JPEG. With a progressive JPEG, the multiple scans of the image are performed according to a scan script that includes transcoding parameters which define the data that is encoded during each scan. For example, a JPEG typically includes three channels: a luma channel (Y) and two chroma channels (Cr and Cb). Each channel may include 64 coefficients that provide the data for the channel: one DC coefficient and sixty-three AC coefficients. Some of the coefficients for certain channels impact the image more than others, and so progressive JPEGs may send the most important impactful and less data-intensive information in the first scan, then subsequently balance the effect of the remaining data on the image with the amount of data needed to achieve that effect in subsequent scans. To determine which of this data will be included in which scan, the intermediate server analyzes the image, selects appropriate transcoding parameters, and generates or applies a scan script to define the various scans of the image. The image is then scanned multiple times according to the scan script to generate appropriate image data, which can then be streamed to a recipient device in order to allow the recipient device to render the JPEG progressively.

While this works well in conventional communications systems, recently there has been a trend towards end-to-end encrypted (E2EE) environments. In an E2EE environment, the body of a communication is encrypted on the sending client, and decrypted at the receiving client, in a way that ensures that no other actors can view the message. Thus, any intermediate servers that handle the communication cannot view the communication contents. If the message includes an image, the intermediate server cannot determine the transcoding parameters, making it difficult to efficiently transmit the image.

Exemplary embodiments address these and other issues relating to image transmission and receipt. The techniques described improve the speed and rendering quality of an image (such as a JPEG) and are particularly well-suited to an end-to-end encrypted environment (E2EE).

According to exemplary embodiments, the image may be analyzed on the sending-client side and the image data may be broken into multiple categories or segments. In one embodiment, the image data is broken into two chunks: a thumbnail chunk, and a high-quality image chunk. The full-quality image chunk depends on the thumbnail chunk, such that the image data from the thumbnail chunk is re-used when rendering the full image using the high-quality image chunk.

The sending client determines the chunks, identifies the chunk sizes, and calculates hashed-based message authentication codes (HMACs) over each of the chunks. The image data may be encrypted and uploaded to a blob store, and a notification message may be sent to the receiving client with the determined image information and a suitable decryption key. The receiving client may first download the thumbnail chunk and use it to render a thumbnail; in some embodiments, the thumbnail chunk may be automatically downloaded when a message is received. The user on the receiving side can view the automatically downloaded thumbnail and determine if they wish to download the full image at high quality.

Accordingly, the low-quality version of the image can be used as a thumbnail. However, this approach has several advantages over conventional thumbnails, which are typically smaller images that are independent from the full-quality images they represent (e.g., stored as a separate file). In the embodiments described herein, the low-quality version includes data that can be combined with the mid-quality data to generate a medium quality (and, subsequently, high-quality) version of the image. As a result, images are rendered faster, and the quality increases over time (instead of loading top-to-bottom like a conventional JPEG).

Moreover, the chunks are defined and processed entirely at the clients, without the assistance of the blob store (which merely holds the encrypted chunks) or the intermediate server (which simply relays the encrypted message from the sender to the client). Thus, the intermediate server does not need to process the image and prepare transcoding parameters.

In another embodiment, the image data may be broken into more than two chunks, where each chunk could be rendered (in conjunction with previous chunks) to provide increasingly high levels of quality. For example, if the image data is broken into four chunks, the chunk may include a thumbnail chunk, a mid-quality chunk, a high-quality chunk, and a full-quality chunk. At the recipient side, the image data may be retrieved from the blob store, decrypted, and each chunk may be rendered at progressively increasing levels of quality. In some embodiments, clients in low-quality networks may request only the chunks leading up to a medium-quality rendering, thus consuming less data.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Images of Varying Qualities

FIGS. 1A-1E depict various examples of an image transcoded at different qualities according to an exemplary embodiment.

Figure 1B:
Figure 1C:
Figure 1D:
Figure 1E:
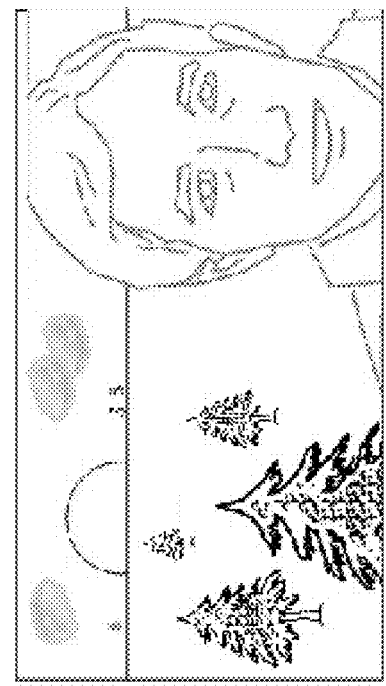

The final image depicted in FIG. 1E is the full-quality image, encoded with 100% of the information making up the image. In the case of a JPEG, for example, this image might include data for all 64 coefficients for all three channels of data (Y, Cr, and Cb).

The first image depicted in FIGS. 1A-1B includes only a small amount of image data (e.g., roughly 20-45% of the image data, depending on the image). This image data might include, for instance, all but the last two bits for the DC coefficients for all three image channels (Y, Cr, and Cb). At full size (FIG. 1A), this image is clearly of quite low quality. However, when reduced in size (FIG. 1B), the quality may be sufficient for the image to serve as a reasonable thumbnail.

The second image depicted in FIG. 1C includes additional data that supplements the data making up the thumbnail from FIG. 1A (e.g., roughly 36-67% of the image data, depending on the image). The low-quality image data might include data from several scans; in one example, this might include the remaining bits from the DC coefficients for all three image channels, as well as other data (e.g., the AC coefficients for both chroma channels and all but the last two bits of the AC coefficients from the luma channel). This image may be suitable for use as a low-quality image. The resulting image is of higher quality than the thumbnail, but the difference between this low-quality image and the full-quality image may be readily apparent.

The third image depicted in FIG. 1D includes additional data that supplements the data making up the thumbnail and the low-quality image (e.g., roughly 56-81% of the image data, depending on the image). The mid-quality image may include data from one or several scans; in one example, this might include the second-to-last bit of the AC coefficients for the luma channel. This image may be suitable for use as a mid-quality image. In fact, in many applications it may be difficult for the human eye to distinguish the difference between the mid-quality image of FIG. 1D and the full-quality image of FIG. 1E. Thus, especially when a user's network connection is not sufficiently fast or stable, the user's client device may choose to download only up to the mid-quality image, thus avoiding the need to transmit the remainder of the data making up the difference between the mid-quality version and the full-quality version.

Finally, the full-quality image (FIG. 1E) may include the remaining image data not captured by the thumbnail, low-quality, and mid-quality image data. In the example above, this would include the remaining final bit of the AC coefficients from the luma channel.

The four qualities in FIGS. 1A-1E are only one example of how an image can be encoded at varying qualities. In exemplary embodiments, images may be encoded with as few as two qualities (e.g., a thumbnail version as depicted in FIG. 1A and a full quality version as depicted in FIG. 1E), three qualities (e.g., a thumbnail corresponding to the image from FIG. 1A, a low-quality version which may correspond to the image from FIG. 1C or 1D, and a high quality version corresponding to the image from FIG. 1E), or may be encoded with more than four qualities.

An exemplary system for distributing images such as those described above is next described with respect to FIG. 2.

Exemplary Communication Environment

Figure 2:
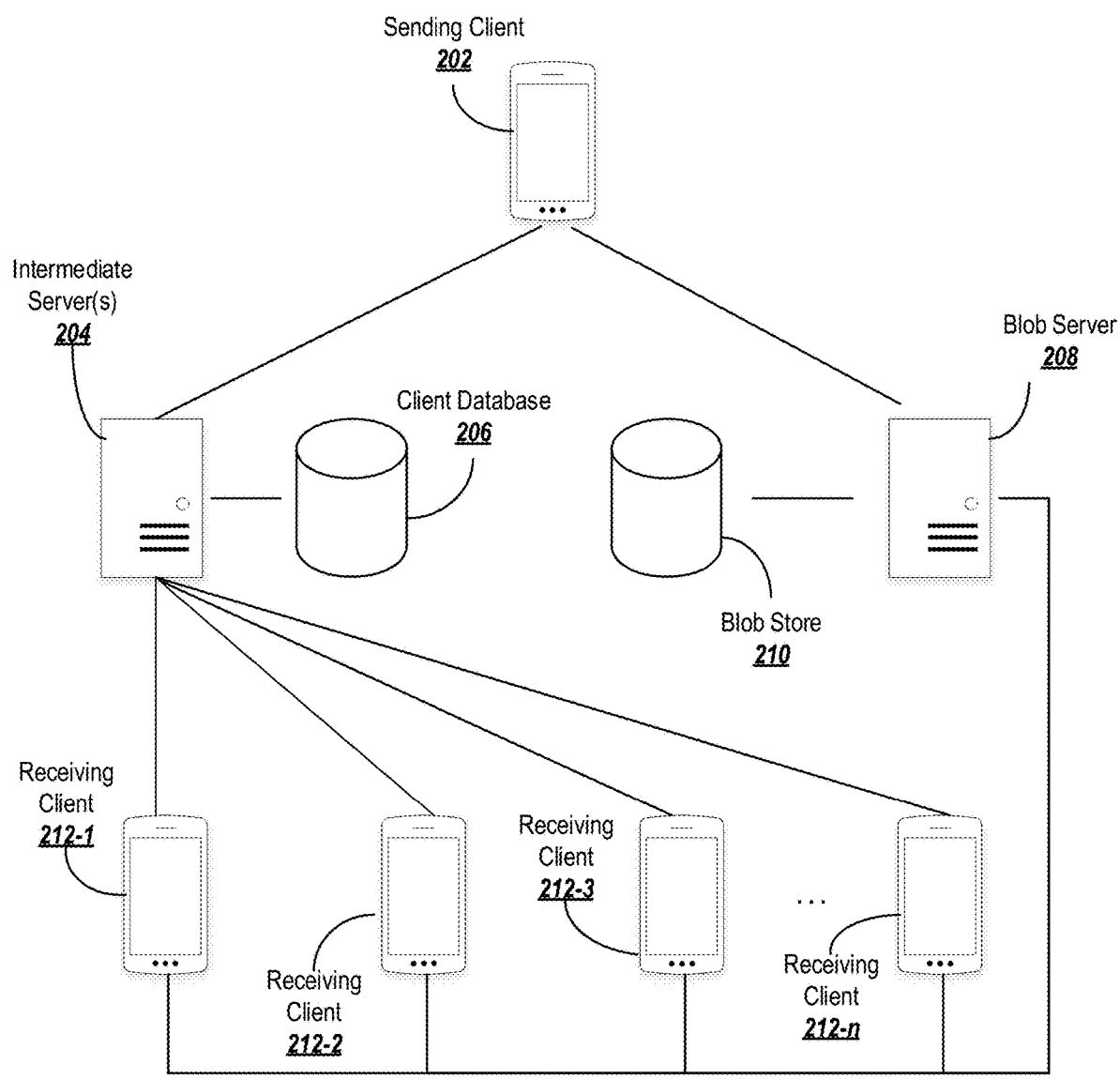
FIG. 2 depicts an exemplary communications system suitable for transmitting an image in an end-to-end encrypted fashion.

As shown in FIG. 2, exemplary embodiments may provide communications services (potentially including end-to-end encryption) and/or social networking services between a sending client 202 and a receiving client 212-i facilitated by an intermediate server 204. Some embodiments described herein utilize server-side fan out to transmit group messages and broadcasts. In a server-side fan out procedure, the sending client 202 transmits a single copy of the message to the server 204, which then transmits a copy of the update to the appropriate recipient clients 212-i. To this end, the intermediate server 204 may store client information in a client database 206, allowing for the distribution of messages to the client devices 212-i.

In order to transmit media and/or attachments, the communications system may also include a blob server 208 hosting a blob store 210 (this may be hosted as a part of the intermediate server 204, or may be provided separately). When sending a message including a media item (such as an image or video), the media item may be uploaded to the blob store 210 as the message is pushed out to the receiving clients 212-i. Optionally, a low-quality thumbnail may be provided to the receiving clients 212-i, while the original media item is stored in the blob store 210. When the receiving clients 212-i attempt to access the media item, the receiving client 212-i may request the media item from the blob server 208, which retrieves the requested media item from the blob store 210 and sends it to the receiving client 212-i. This may be done by establishing a streaming connection to the receiving client 212-i and transmitting the data as part of the stream.

Use of the blob store 210 to transmit content (particularly in conjunction with sending an encrypted message) can facilitate providing the content to the receiving clients 212-i, particularly if a client is offline when the update is sent and/or if different clients 212-i attempt to access the content at different times.

In operation, exemplary embodiments may place the image processing logic, which processes the images, breaks them into scans, organizes the data image data into chunks suitable for streaming, calculates keyed-hash message authentication codes, forwards the images, at the sending and receiving clients. The intermediate server 304 may be configured only to forward image messages including a reference to the image, which is then retrieved by the receiving clients 212-i from the blob server 208. Such logic is described in more detail below with reference to FIG. 3.

Exemplary Computing Systems

Figure 3:
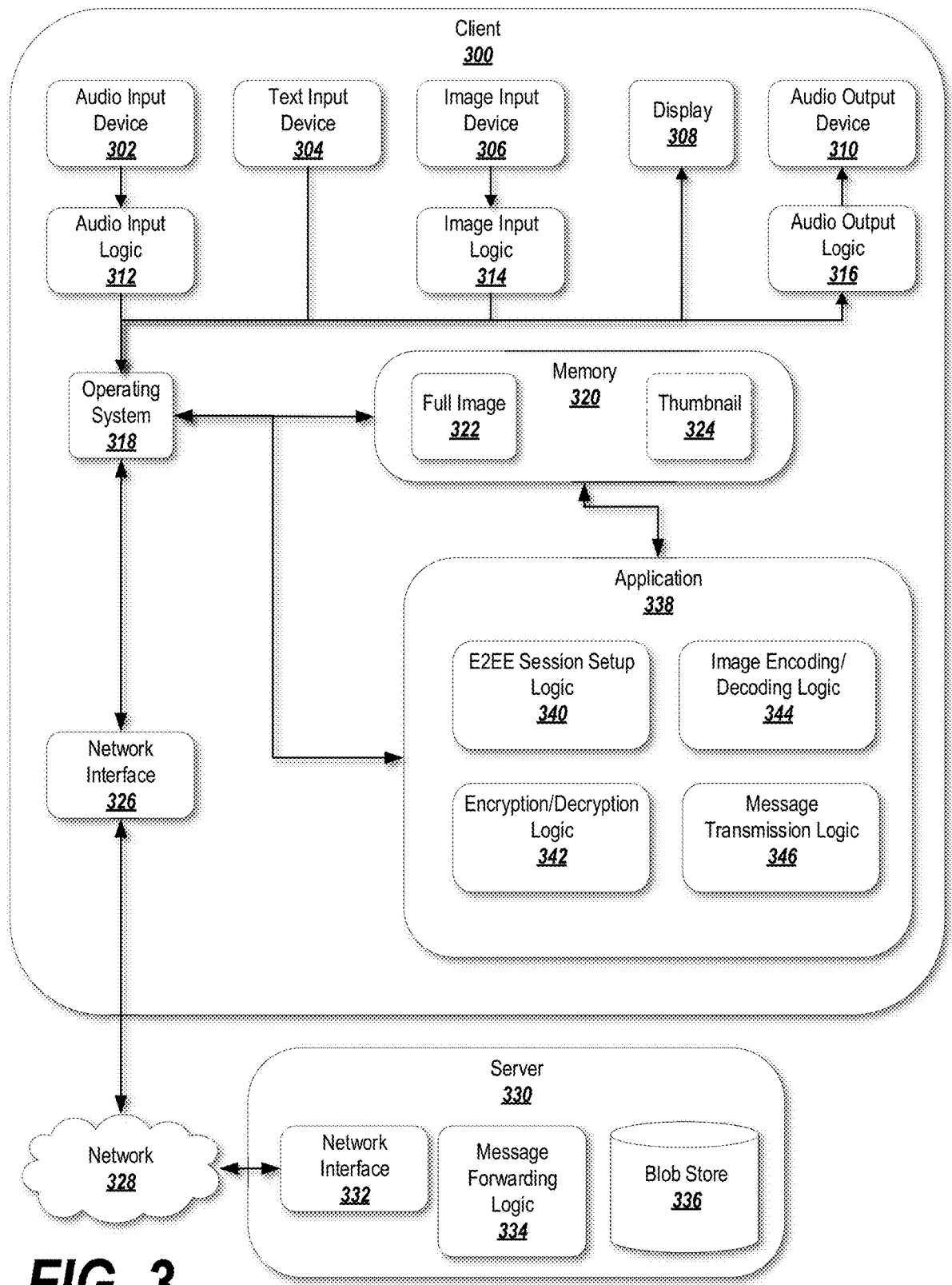
FIG. 3 is a block diagram depicting exemplary computing systems suitable for practicing exemplary embodiments.

FIG. 3 is a block diagram depicting an exemplary reply recommendation system suitable for use with exemplary embodiments.

A client 300 may be used to capture an image, record audio/video, display an image, and/or play an audio/video feed. The client 300 may be, for example, a computer, a mobile device, a special-purpose media creation device, or any other suitable client device.

The client 300 may include an audio input device 302, such as a microphone. The audio input device 302 may record audio in the vicinity of the client device and forward the recorded audio to audio input logic 312 for processing. The audio input logic 312 may process the recorded audio, potentially with the assistance of sound analysis logic in order to extract information from the audio (e.g., a textual transcript). The audio input logic 312 may, for example, perform speech-to-text processing, analyze tone and/or pitch in the audio, provide the audio directly to a machine learning system for analysis, etc.

The client 300 may further include a text input device 304, such as a physical or on-screen keyboard for entering text.

The client 300 may include an image input device 306, such as a camera capable of recording still images and/or video. Image input logic 314 may process incoming graphical content, for example to be used by the client-side image processing logic 600 and/or the client-side multi-scan logic 700.

The audio input logic 312 and/or image input logic 314 may additionally or alternatively be located at the server 330.

The client 300 may include a display 308, such as a touch screen or other display device. The display 308 may display a communications or social networking interface, including the images as depicted in FIGS. 1A-1E.

The client 300 may include an audio output device 310, such as a speaker or audio output jack. The audio output device 310 may play audio associated with an update, such as the audio track included with a video. The audio output device 310 may receive the audio through audio output logic 316, which may work in conjunction with the operating system 318 and/or an application 338 to provide output audio.

Any or all of the audio input device 302, the text input device 304, the video input device 306, the display 308, and the audio output device 310 may be integrated with the client 400, or may be provided externally to the client 300 and connected to the client 300 in a wired or wireless manner. These devices may also be used to support a communications application, such as an application for making video calls, a messaging application, or a social networking application.

An operating system 318 may support the client 300, and may coordinate and/or control the audio input device 302, the text input device 304, the video input device 306, the display 308, the audio output device 310, a memory 320, an application 338, and/or a network interface 326.

The memory 320 (e.g., RAM, ROM, etc.) may store data structures for use by the application 338 and/or the operating system 318. For example, the memory 320 may store a message that has been received by the application 338, where the message includes graphical content. An image 322 captured by the image input device 306 and/or transferred from a sending client may be stored in the memory 320, as well as a thumbnail 324 of the image 322 if one is retrieved from the blob server.

The client 300 may execute an application 338 capable of sending and receiving communications on a network. These capabilities may also be split between multiple applications 338. The application 338 may be, for example, a communication, social networking, or other type of application that incorporates update and reply capabilities.

The application 338 may support image and/or video capture logic 340 capable of capturing, processing, analyzing, and displaying graphical content. For example, the image/video capture logic 340 may support interface logic configured to generate a social networking or messaging interface.

The application 338 may also support E2EE session setup logic 340 configured to establish an end-to-end encrypted session from a sending client to a receiving client over a communication network. The E2EE session setup logic 340 may be configured to, for example, send an E2EE setup message from a sending client to a receiving client, where the setup message includes parameters (such as a decryption key) allowing the sender and recipient to encrypt and decrypt messages to each other so that intermediate devices (such as the server 330) cannot read the message content.

To that end, the application 338 may support encryption and decryption logic 342 configured to encrypt and decrypt messages sent over the E2EE connection. The encryption and decryption logic 342 may apply any suitable encryption and decryption algorithm, such as Advanced Encryption Standard (AES) algorithm, Diffie-Hellman algorithms and their variants, or any other suitable encryption algorithm.

The application 338 may also support image encoding/decoding logic 344 suitable for processing an image 322. The image encoding/decoding logic 344 may break the image into a thumbnail and full image, as in the embodiments described with respect to FIGS. 5-6B, or into multiple intermediate image qualities, as in the embodiments described with respect to FIGS. 7-8B.

The application 338 may further support message transmission logic 346 configured to generate a message that may include information about the image 322, and transmit the message to the server 330 to be retransmitted to a recipient client.

The application 338, memory 320, and I/O devices may communicate, through the operating system 318, with a network interface 325 for communication on a network 328, such as the Internet. The network interface 326 may be, for example, a network interface card (NIC) or other suitable hardware and/or software for managing network transmissions and receptions.

The client 300 may, through the network interface 326, communicate with a corresponding network interface 332 on a server 330. The server 330 may provide support for the application 338 and, to that end, may receive messages from the client 300 and forward them to one or more receiving clients using message forwarding logic 334. The server 330 may also support a blob store 336 (or the blob store 336 may be stored on a separate device) for storing an encoded and encrypted version of the image 322.

Any or all of the above-described logic may be executed via instructions on one or more hardware processors. The instructions may be stored on a physical non-transitory computer-readable storage medium.

It is noted that, although the logic and data structures are depicted in a particular configuration in FIG. 3 (with some on the client 300 and others on the server 330), other configurations are also contemplated in connection with the present invention.

Exemplary Data Structures

Figure 4A:
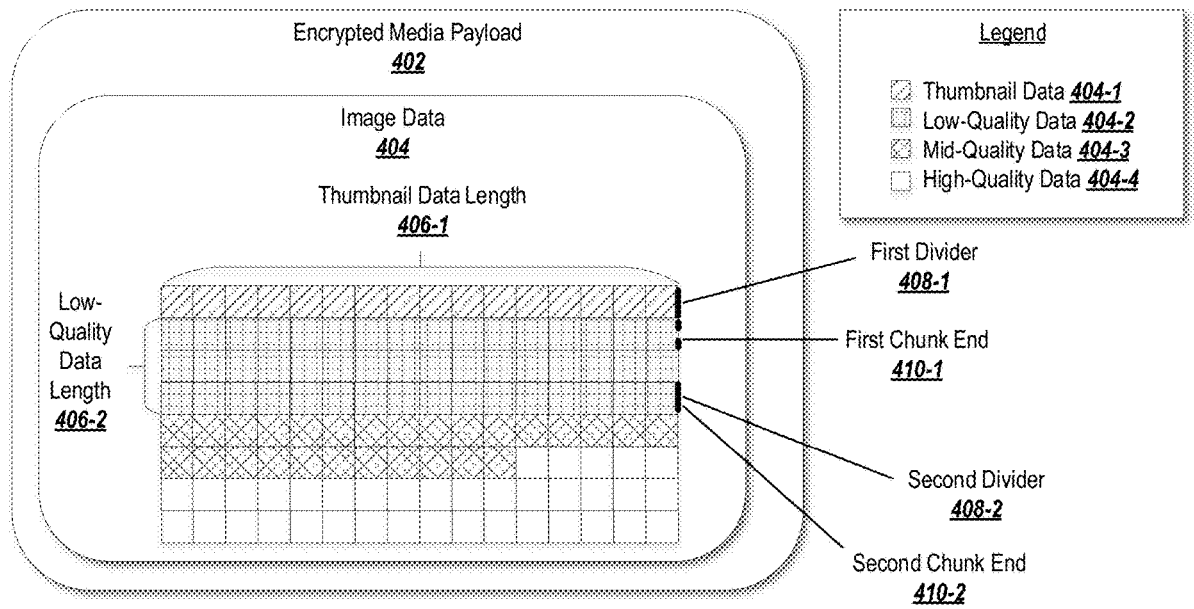
FIG. 4A depicts an exemplary data structure suitable for storing image data according to an exemplary embodiment.

FIG. 4A depicts a data structure suitable for storing image data 404 in an encrypted payload 402. The image data 404 may be broken into multiple qualities 404-$i$, which may be determined and constructed by the sending client device. The qualities 404-$i$ may each include one or more image scans, and may be represented in the image data 404 in a sequential order so that the image quality increases when moving from one quality (404-$i$) to the next (404-$i$+1). For example, the first quality in FIG. 4A includes data corresponding to a thumbnail quality 404-1, while the second quality includes data corresponding to a low quality 404-2, when rendered in conjunction with the data from the thumbnail quality 404-1.

The amount of image data corresponding to each quality 404-*i* may vary. For instance, in this example the thumbnail quality 404-1 includes eight blocks of data, for a data length 406-1 of 8. The low-quality data 404-2 includes twenty-four blocks of data, for a data length 406-2 of 24. A first divider 408-1 after eight blocks of data represents a conceptual dividing point (it may or may not correspond to actual information stored in the data structure) between the thumbnail data 404-1 and the low-quality data 404-2. Similarly, a second divider 408-2 after thirty-two blocks of data represents a conceptual dividing point between the low-quality data 404-2 and the mid-quality data 404-3.

When the image data 402 is transmitted from the blob store to the receiving client, it may be transmitted as part of an encrypted data stream. Such data streams may be transmitted in chunks, where each chunk's size may be a multiple of the AES block size (e.g., 16 bytes). However, there is no guarantee that the dividers 408-*i* between the different qualities 404-*i* will correspond to the dividing points between chunks. In the example depicted in FIG. 4A, the first chunk has an ending point 410-1 after 16 blocks, while the second chunk has an ending point 410-2 after 32 blocks. Thus, when the first chunk is transmitted, it will include all the thumbnail data 404-1 and one-third of the low-quality data 404-2. The second chunk will include the remainder of the low-quality data 404-2.

Figure 4B:
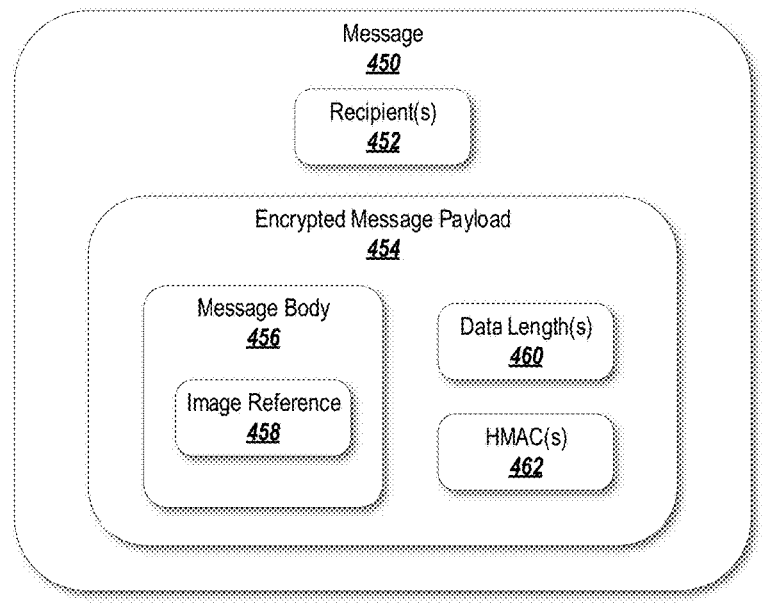
FIG. 4B depicts an exemplary message structure according to an exemplary embodiment.

The HMACs for the encrypted data stream are generally calculated over each chunk. Accordingly, the sending client may determine and perform the scans of the image, and may also determine where the dividing points between the various chunks will be located. The sending client may calculate the HMACs over these chunks. The sending client may upload the image data to the blob store, and may transmit an image message containing information about the image to the receiving client. An example of such an image message 450 is depicted in FIG. 4B.

The image message 450 may identify the recipient or recipients 452 for the message. This information may be used by the server to route the message to the appropriate receiving client devices.

The image message 450 may also include encrypted message data 454, which may be encrypted/decrypted by the encryption/decryption logic 342 on the client device 300. The payload 454 may include various encrypted message data. For instance, a message body 456 may include message information to be displayed in an interface of a messaging application. The message body 456 may include, for instance, text to be displayed in the message. If the message includes (or consists of) an image, the message body 456 may include a reference 458 to the image, which may be stored remotely on the blob store. The reference 458 may include, for example, a pointer to the image on the blob store, or an identifier for the image so that the image can be retrieved from the blob store.

The payload 454 may further include information describing how the image is broken up into various qualities so that it can be sequentially reconstructed by the recipient device. For example, the payload 454 may include the length(s) 460 of the data corresponding to each quality. In the case where the image data is broken into a thumbnail and full image data, the length(s) 460 may be a single value corresponding to the length of the thumbnail data 404-1. If the data is broken into intermediate qualities, the length(s) 460 may be represented as an array or list that includes the length of the data corresponding to each quality of image.

Using this information, the receiving client can determine where, within each chunk, any dividing lines between image data of different qualities may be. The receiving client may use this information to render the image at the corresponding quality, and/or to stop the data stream prior to downloading the full image if the network quality is relatively low.

Alternatively or in addition, the payload 454 may include a list of where each scan from a progressive scan script begins. Accordingly, the image may be loaded as a progressive image (e.g., a progressive JPEG) by refreshing the UI each time a new scan is received. This may allow for further intermediate states within a particular image quality, if that image quality is made up of multiple scans (e.g., see the low-quality example in Table 1, below).

The payload 454 may also include the sender-calculated HMACs 462 for each image chunk. Upon receiving a chunk, the recipient may calculate its own HMAC for the chunk and compare it to the HMAC 462 in the image message 450. If the HMACs are the same, the recipient can verify the integrity of the received data. If the HMACs differ, then the data has either been corrupted or tampered with in transmission. The recipient may take appropriate action in this case, such as requesting a new copy of the data, or terminating the transmission.

Embodiment for Providing a Thumbnail and a Full Image

Figure 5:
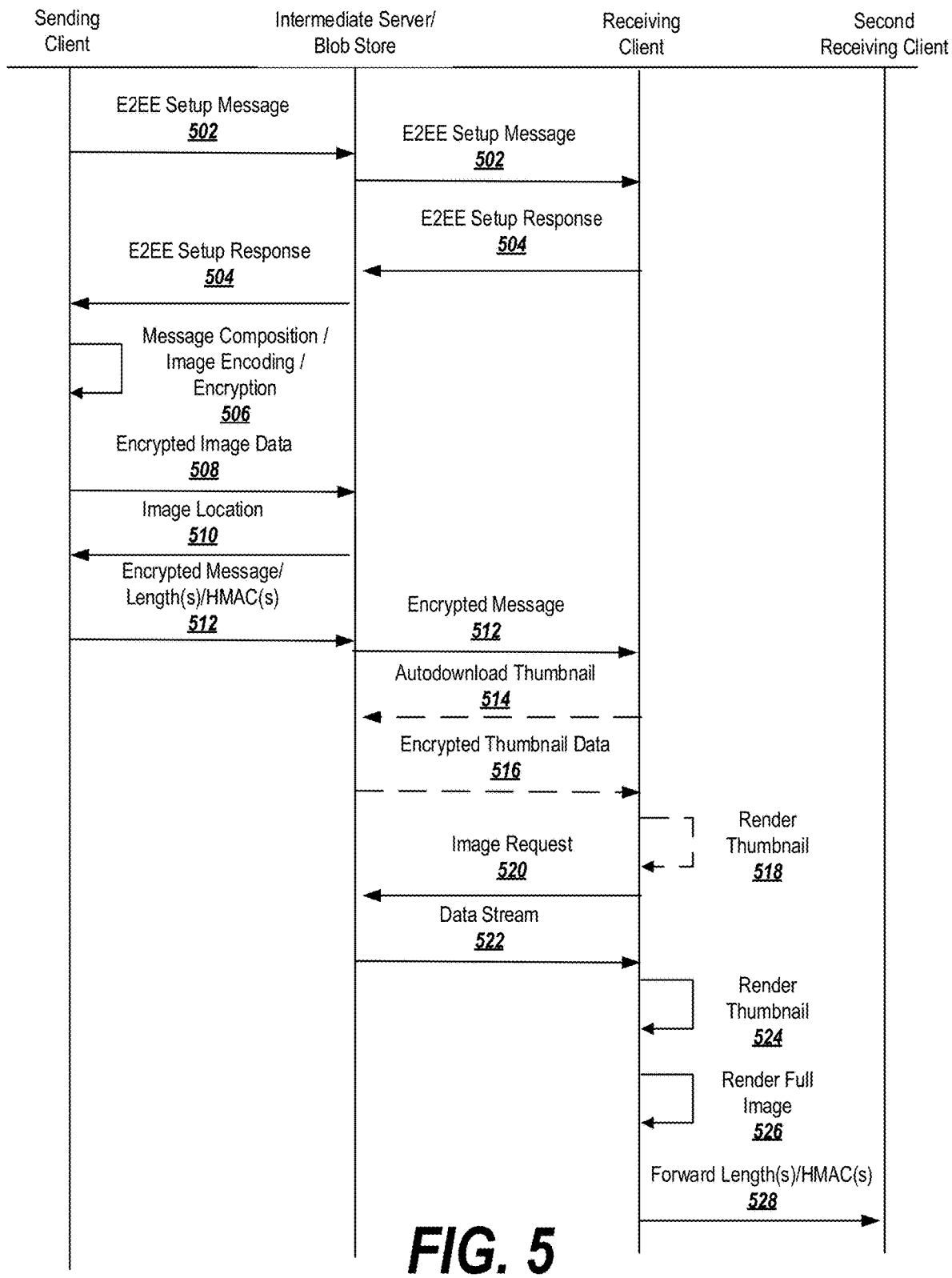
FIG. 5 is an exemplary data flow diagram depicting information exchange among computing systems in a first embodiment.

FIGS. 5-6B provide data flow diagrams and flow charts describing a first embodiment in which an image is broken into a thumbnail and full quality image. It is contemplated that the embodiment depicted in FIGS. 5A-6B may be employed in connection with any of the thumbnail/full image embodiments described above, and may be extended with the multi-scan embodiments depicted in FIGS. 7-8B.

As shown in FIG. 5, the sending client may first send an end-to-end encryption (E2EE) setup message 502 to the intermediate server. The intermediate server may forward the E2EE setup message 502 to the receiving client. The receiving client may generate an E2EE setup response 504, and transmit the response 504 to the server. The server may relay the response 504 to the sending client. The setup message 502 and response 504 may include all the information necessary to establish an E2EE session between the sending client and the receiving client.

On the sending client, a user may engage with a communications application to compose a message (process 506). The message may include an image. In response to receiving a request to transmit the message, the image may be encoded and encrypted, using the process described in FIG. 6A. The encrypted image data 508 may be uploaded to the blob server, which may respond with a location 510 of the image on the blob server.

An image message 512 may be generated, which includes encrypted message content; the encrypted message content may include the lengths of each set of data corresponding to different image qualities (see FIGS. 4A-4B), the HMACs of each data chunk in the image data, and a reference to the image. The reference may be, or may be derived from, the image location 510 received from the blob store. The image message 512 may be transmitted to the server, and then relayed from the server to the receiving client.

The receiving client may decrypt the image message using the information from the E2EE setup and response messages 502, 504. The receiving client may recognize that the decrypted message includes a reference to an image, and may determine if autodownloading of image thumbnails is enabled. Autodownloading may be enabled or disabled, for example, in a setting of the user's communication application, and autodownloading may be disabled in certain contexts (e.g., if the user is on a cellular data network, if the network is unstable or slow, etc.). If autodownloading is enabled, then the receiving client may transmit a request 514 to the blob store to download the thumbnail portion of the image data. This may include setting up a data stream with the blob store, initiating a download 516 of the image data referenced in the image message, and terminating the data stream once enough of the image data is received to render the thumbnail at 518.

The communications application may request 520 that the image be retrieved from the blob store. This request 520 may be in response to a user requesting the full image (e.g., by clicking on the thumbnail), if autodownloading was enabled and performed. Alternatively or in addition, the image may be downloaded in response to a thread including the message being opened in the communication application.

In response to the request 520 for the image data, the blob server may transmit a data stream 522 to the receiving client. The image data may be streamed sequentially, so that the thumbnail data is transmitted first and the full image data is transmitted second. If the thumbnail data was already transmitted at 516, then only data which has not yet been retrieved may be transmitted in response to the subsequent image request 520. After the thumbnail data is downloaded at 516, it may be stored in a thumbnail folder so that it remains available to be combined with the data retrieved at 522. If autodownloading is not enabled, then the entire image (first the thumbnail data, then the subsequent full image data) may be retrieved in response to the single image request 520.

As the data is received, it may be rendered at the receiving client. In the case of a thumbnail/full image embodiment, the thumbnail may first be rendered at 524, and then the UI may be updated when the full image is available at 526.

At some point, the receiving user may request that the receiving client forward the image. If the receiving client still has stored in it memory a copy of the image reference, data lengths, and HMACs as received in the encrypted message 512, this information may simply be forwarded 528 to the next client, without re-encoding the image.

These messages may be generated and transmitted in accordance with the procedures depicted in the flowcharts of FIGS. 6A (sender-side) and 6B (recipient-side). The exemplary logic may be implemented in hardware, software, or a combination of hardware and software (e.g., being implemented at least partially in hardware). For example, the logic may be embodied as digital logic, which may be implemented at least partially in hardware, embodying instructions for a processor circuit to perform the steps described below. Although FIGS. 6A-6B (and 8A-8B) depict a particular arrangement of logical elements in a particular order, it is understood that the configurations depicted is but one example. In other embodiments, more elements may be provided and/or some elements may be omitted, some elements may be performed in parallel, and/or elements may be performed in a different order. In some embodiments, some of the depicted elements may be performed on different systems.

In the sending-client side image processing logic 600, processing may begin at block 602 where the sending client sets up an E2EE session with a receiving client. The sending client may set up the E2EE session in response to receiving a request to transmit a message from the sending client to the receiving client. Setting up the E2EE session may include, for example, exchanging encryption and decryption keys between the sending client and the recipient client.

At 604, the sending client may receive a request in an interface of a communication application to compose a message to the receiving client (block 604 may precede block 602, in some embodiments). The message may include an attachment such as an image, which may be stored in a memory or storage of the sending client. Accordingly, at block 606, the communication application may retrieve the image from storage or memory. Alternatively, the image may be stored remotely, and at block 606 the communication application may request a copy of the image from the remote location.

At block 608, the system may determine if multi-scan is enabled. In some embodiments, multi-scan may be used to scan the image at a thumbnail quality, and at least one additional intermediate quality between the thumbnail quality and the full image quality. Multi-scan may be enabled by default, based on user settings, or in certain contexts (e.g., if the image is expected to be downloaded from an unreliable or slow network). If so, processing may proceed to block 802 (see FIG. 8A).

If multi-scan is not enabled, then at block 610 the image may be scanned with two qualities. For example, the image may be scanned as a progressive JPEG using a scan script. One example of a scan script that provides two or four qualities of image is as follows:

TABLE 1

| Scan No. | Scan Configuration | Quality Level (Multi-Scan/Thumbnail) | Scan Length |
|---|---|---|---|
| 1 | [0, 1, 2], 0, 0, 0, 2 | Thumbnail | scanLengths[0] |
| 2 | [0, 1, 2], 0, 0, 2, 1 | Low Quality Full Image | scanLengths[1] |
| 3 | [0, 1, 2], 0, 0, 1, 0 | | |
| 4 | [1], 1, 63, 0, 0 | | |
| 5 | [2], 1, 63, 0, 0 | | |
| 6 | [0], 1, 63, 0, 2 | | |
| 7 | [0], 1, 63, 2, 1 | Mid Quality Quality | scanLengths[2] |
| 8 | [0], 1, 63, 1, 0 | Original Image | scanLengths[3] |

In this example, the first scan is the initial scan for the DC coefficients of the Y, Cr, and Cb channels, minus the lowest two bits. This information is suitable for use as a thumbnail for the image.

The next five scans produce a low quality image. Of these, the first two (scans #2 and 3) capture the second-to-last and last bits, respectively, of the DC coefficients for the Y, Cr, and Cb channels. The third (scan #4) captures the AC coefficients for the Cr chroma channel, while the fourth (scan #5) captures the AC coefficients for the Cb chroma channel. The fifth (scan #6) captures all but the last two bits of the AC coefficients for the Y luma channel.

Typically, the AC coefficients for the luma channel include the most data, and are downloaded last. Thus, the next scan (scan #7), which can be combined with the previous scans to produce a mid-quality image, reads in the second-to-last bit of the AC coefficients for the Y luma channel. The final scan (scan #8) produces the full high-quality image (when combined wi the previous scans) by reading in the lowest bit of the AC coefficients for the Y luma channel.

It is noted that this particular scan script configuration is exemplary only, and uses particular data that has been found, in practice, to reasonably balance the size of each respective scan with the quality that results from rendering the scan in conjunction with previous scans. For instance, the first scan that produces a progressive thumbnail tends to provide a relatively high amount of information in a relatively low amount of data. The quality is not sufficient for this information to represent a mid-quality image, but it is sufficient for use as a thumbnail. In practice, the low-quality scans tend to bring in about half of the image data (about 36-67%, with an average of about 48%), whereas the mid-quality scans tend to bring in 56-81% of the image data, with an average of around 66%. In many cases, the mid-quality images are indistinguishable to a human from the original full-quality image.

In embodiments providing a thumbnail and full image (i.e., without intermediate low-quality and mid-quality renderings), the second-through-eighth scans may be treated as the full image data. Note that in both the multi-scan and thumbnail/full image embodiment, the image may still be processed as a progressive JPEG. However, the clients may be configured to treat the first scan (or scans) as thumbnail data, and may make use of the other tiers (low-quality and mid-quality) to perform other processing steps. For example, depending on the network quality and available bandwidth, the receiving client may choose to receive only the amount of data leading up to a low-quality or mid-quality image. In such an embodiment, thresholds may be defined for various network quality parameters (e.g., throughput, bitrate, packet drop rate, etc.). If the network quality is above a first (low) threshold level, then the low-quality image is received and the receiving client may terminate the stream of data upon receiving the scans corresponding to the low-quality image. If the network quality is above a second (intermediate) threshold level, then the medium quality image is received and the receiving client may terminate the stream of data upon receiving the scans corresponding to the medium-quality image. If the network quality is above a third (high) threshold, then the full image may be received and the receiving client may terminate the stream of data upon receiving all the available scans.

The system may adjust the scan script, or may apply a different scan script, for various reasons. For example, using different transcoding parameters may result in a smaller file size, and such parameters may be selected in order to reduce the amount of data transmitted over the network. Additionally, because each scan of the image consumes processing and other computing resources, and because these resources may be more limited on an end-user client device than on a central server, the system may choose to perform fewer scans depending on the quality of the hardware on the end-user client device.

As a result of scanning the image at block 610, image data is created, where the image data includes data corresponding to the thumbnail scan(s) and the remaining image data. At block 612, the system may calculate the length of the thumbnail scan(s). This may be done, for example, using a progressive JPEG parser that identifies the location in the image data corresponding to where a particular scan ends and the next scan begins.

At block 614, the system may encrypt the generated image data using any suitable encryption algorithm. At block 616, the system may divide the encoded image data into chunks in accordance with an encrypted data streaming algorithm, and at block 618 the HMAC of each chunk may be calculated.

At block 620, the encrypted image data may be uploaded to the blob store, and the blob store may inform the sending device of the location on the blob store at which the image is saved (or the identifier of the image which may be used to locate the image on the blob store).

Using the information generated at blocks 612, 618, and 620, the system may generate an image message at block 622. The image message may include a reference to the image, which may include the location and/or ID returned by the blob store at block 620, the thumbnail length calculated at block 612 (and/or any other lengths calculated at block 810), and the chunk HMACs calculated at block 618. The content of the image message may be encrypted, and at block 624 the image message may be transmitted to its intended recipient(s).

The procedure depicted in FIGS. 6A (and 8A) may be performed in parallel with or in conjunction with a procedure executing on the recipient-side device. FIGS. 6B (and 8B) is a flowchart depicting exemplary logic 650 (and 850) performed by a system, such as a receiving client, for requesting and displaying a progressive image.

At block 652, the receiving client may perform an E2EE session setup. Block 652 may be the counterpart to block 602, and may include similar or corresponding steps.

At block 654, the receiving client may receive an image message using the E2EE session that was set up in block 652. The image message may include encrypted content, such as an encrypted reference to an image, data lengths, and HMACs.

At block 656, the system may retrieve the lengths of at least some of the data corresponding to the respective image qualities included in image data of the referenced image (such as the length of the thumbnail data). As previously noted, the data lengths may not correspond precisely to the chunk lengths of the E2EE data stream, and so the system may use this information to determine how many chunks are needed in order to obtain the data corresponding to each respective image quality.

At block 658, the system may determine if autodownloading of thumbnails is enabled. If not, processing proceeds to block 660 and the system awaits a request to display the image message before downloading the thumbnail data. Such a request may be in the form of a request to load a thread containing the image message, or to scroll to a point in the thread at which the image can be viewed. Alternatively, if autodownloading is enabled, then processing may proceed directly to block 662.

At block 662, the system retrieves the image data corresponding to the thumbnail from the blob store. This may involve initiating a data stream with the blob store in order to retrieve the image data corresponding to the reference in the original image message. The system may download one or more chunks corresponding to the thumbnail.

At block 664, the system may decrypt the retrieved thumbnail data according to the parameters of the E2EE session established at block 652. At block 666, the system may calculate an HMAC over the encrypted data (block 666 may precede block 664 in some embodiments) to verify that the data is uncorrupted and unaltered. Assuming that this is the case, at block 668 the system may display the decrypted thumbnail. Once the thumbnail data has been downloaded, the system may optionally pause downloading of the rest of the data and/or terminate the data stream with the blob store.

At block 670, the system may receive a request to display the full image. This may be in response to a selection of the thumbnail indicating that the user wishes to view a higher-quality version of the image. Alternatively or in addition, the system may simply continue to download the image data after the thumbnail has been downloaded.

At block 672, the system may initiate a data stream with the blob store and at block 674 may transmit a request to the blob store to download the image data (or alternatively, may continue to download data over an existing data stream). In some embodiments, only one request is needed in order to download all the image data at the various qualities at which the image was encoded (because the image data continues to sequentially stream additional data, which can be cumulatively applied to render the image at increasing levels of quality).

At block 676, the system determines if multiscan capabilities are enabled (similar to block 608 of FIG. 6A). If so, processing proceeds to block 852 (see FIG. 8B). Otherwise, processing proceeds to block 678 and a chunk of data is retrieved over the streaming connection from block 672.

At block 680, the system may decrypt the received chunk and, at block 682, verify the chunk HMAC (blocks 680 and 682 may be reversed in some embodiments). At block 684, the system updates the UI based on the newly-received image data (assuming that the most recent chunk included data up to the end of one of the image scans; otherwise, block 684 may be omitted in this iteration of the loop).

At block 686, the system determines if more chunks remain to be downloaded from the blob store. If so, processing returns to block 678 and the next chunk may be retrieved. If not (i.e., all chunks have been downloaded), processing may terminate because the image has been rendered at full quality.

Figure 6C:
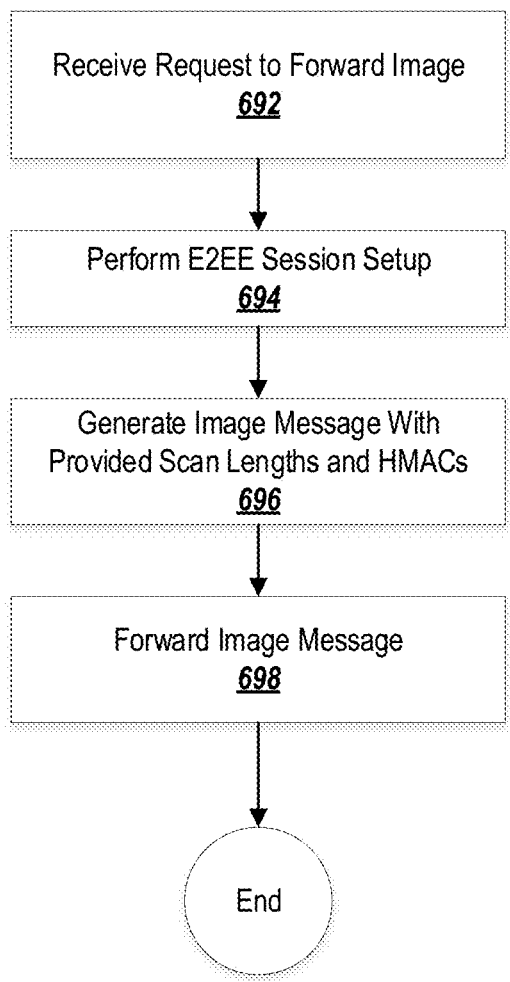
FIG. 6C is a flowchart depicting exemplary receiving-client side image forwarding logic for retransmitting a received image to another client.

After the receiving client has received the image data, the receiving user may request that the image be forwarded to another user. FIG. 6C is a flowchart describing exemplary logic 690 for forwarding the image to a second receiving user.

At block 692, the system may receive a request to forward an image previously downloaded to the receiving client. The request may be to forward the image to a second receiving client, with which the first receiving client may set up an E2EE session at block 694.

Because the image data is already resident at the blob store, and because the various scans and image qualities have already been processed and the HMACs calculated over the relevant chunks, it is not necessary to perform his processing again (assuming that the receiving client still has a copy of the relevant data lengths and HMACs from the original sending client).

Accordingly, at block 696 the system generates a new image message for the second receiving client, which includes the data/scan lengths from the original sender and the HMACs from the original sender. The reference to the image from the original sender may also be included in the new image message.

The new image message may be forwarded to the second recipient at block 698. Accordingly, the second recipient can use the information in the new image message to download the image from the blob store in the same manner as was done at the first recipient.

Embodiment for Providing Multiple Scans

Figure 7:
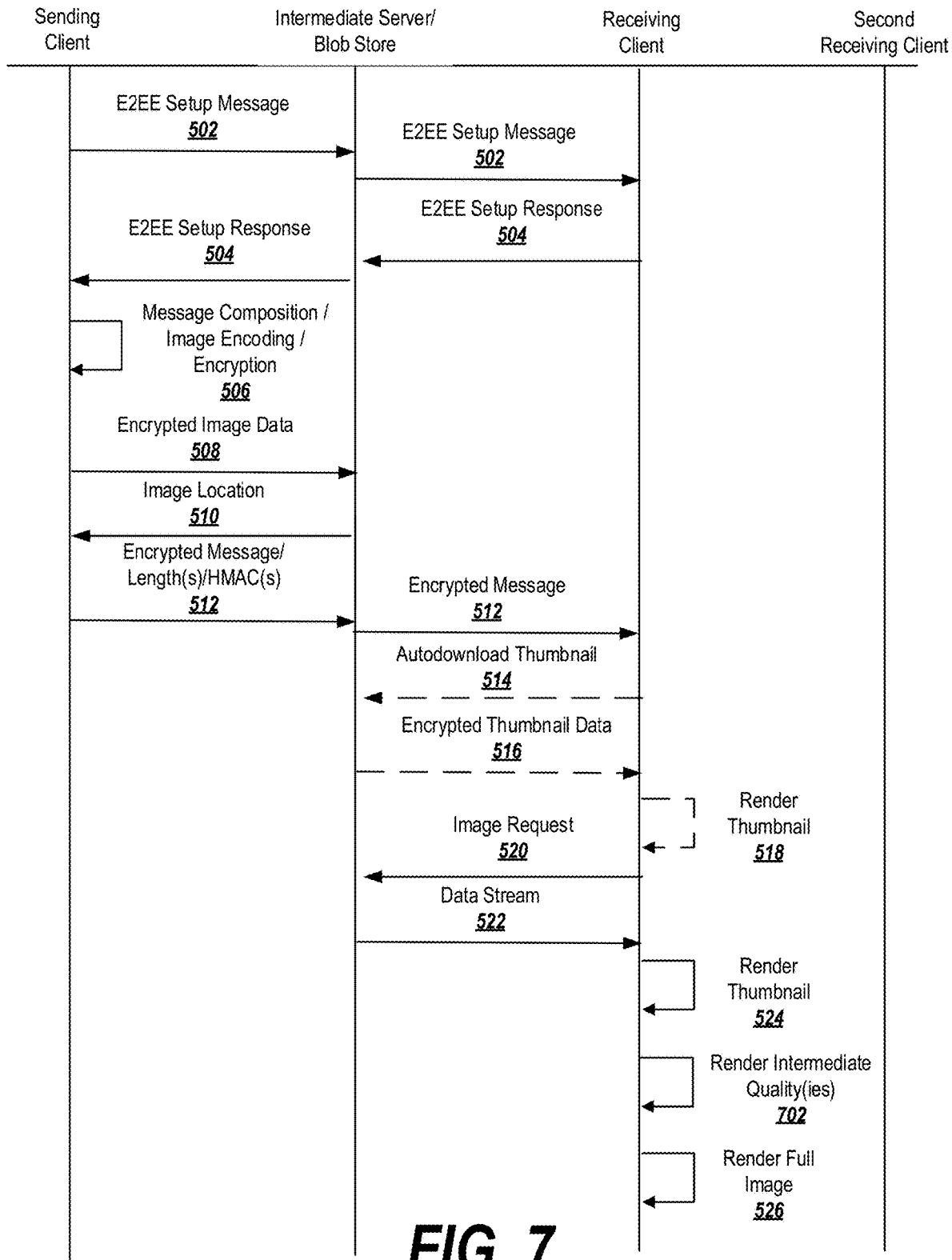
FIG. 7 is an exemplary data flow diagram depicting information exchange among computing systems in a second embodiment.
Figure 8A:
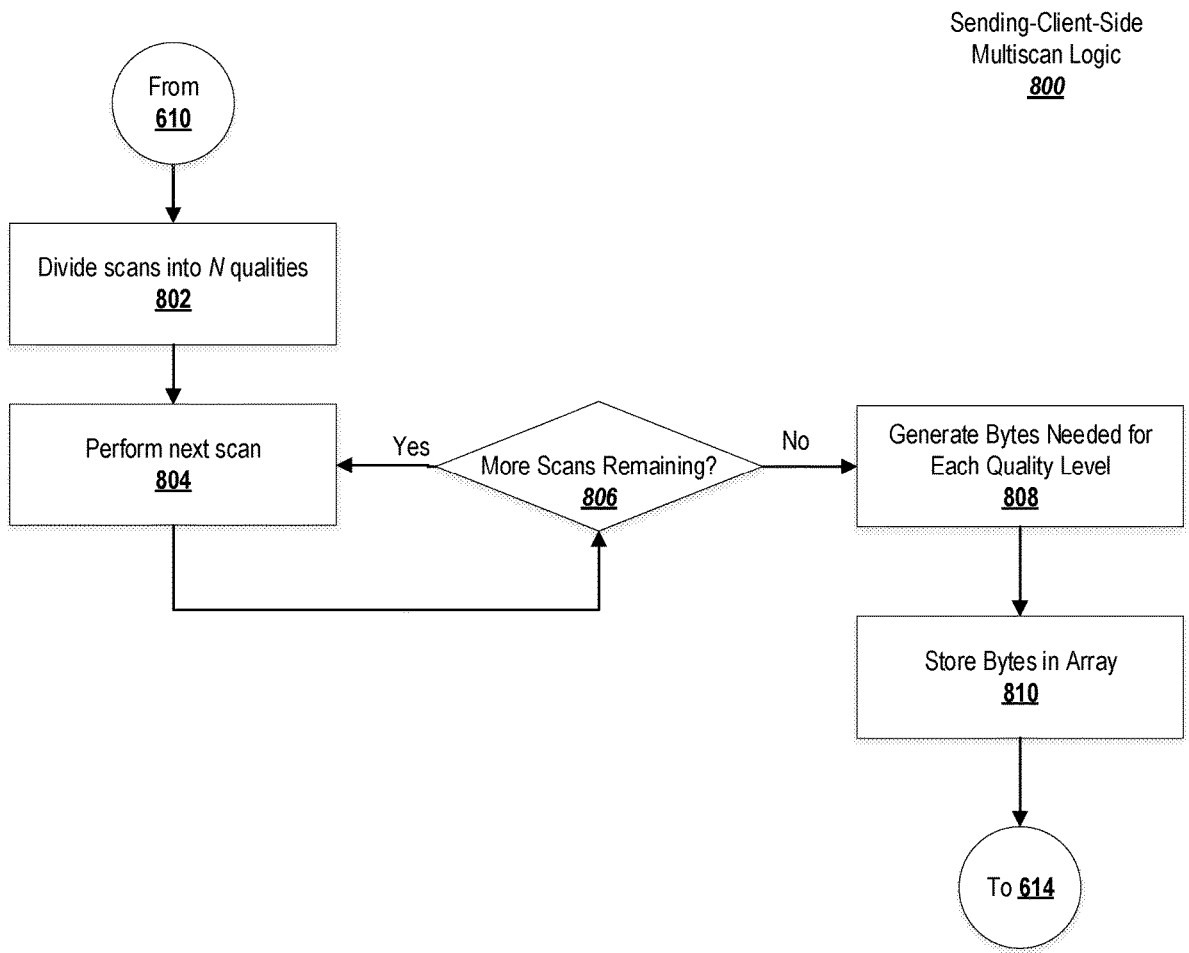

FIGS. 7, 8A, and 8B supplement the procedures shown in FIGS. 5, 6A, and 6B in order to provide a system that generates intermediate image qualities between the thumbnail quality and the full image quality.

The data flow diagram of FIG. 7 is similar to the one depicted in FIG. 5 in many respects. For the sake of brevity, similar message exchanges have been labeled with the same reference numbers in FIGS. 5 and 7, and a description of these similar steps is omitted here for the sake of brevity. One difference between the action taken in FIG. 5 and the one taken in FIG. 7 is that, when the image is encoded and encrypted at 506, it may be encoded at multiple different qualities, as outlined in FIG. 8A. Correspondingly, a new procedure 702 is added to render the image at intermediate qualities, as described in connection with FIG. 8B.

Also, the procedure 528 for forwarding the image to a new recipient is omitted in order to save space, but this procedure (described in FIG. 6C) may be used in connection with the embodiment shown in FIGS. 7-8B in the same manner as described above for the thumbnail/full image embodiment (except that the data lengths corresponding to the intermediate image qualities, not just the thumbnail quality, would be loaded into the new image message).

Turning to FIG. 8A, a procedure for storing the image data so that the image can be represented in intermediate qualities between the thumbnail and full image is described. The logic 800 begins at block 802, which follows block 610 from FIG. 6A. At block 608, the system may divide the image scans used to generate the image data (see, e.g., Table 1) into N qualities. The number N of qualities may depend on the number of intermediate states desired by an administrator of the communications service. For example, at least two image qualities will generally be used (the thumbnail quality and the full image quality). At least one intermediate image quality may also be desirable, for use over network connections that may be unstable or relatively slow. Further intermediate qualities may be used to provide more granularity—for example, a low quality for very bad connections, and an intermediate or mid-quality for better connections that are nonetheless sub-optimal.

Optionally, the system may choose between different available scan profiles, or may adjust a scan script, to provide different numbers or configurations of scans. This may be performed based on available network and/or client hardware information, as well as based on which scan scripts/configurations yield the smallest total image data (or the smallest image data for certain image qualities). The system may assign the scans designated on the scan script between the N different image qualities.

At blocks 804-806, the system may iteratively scan the image until all the scans in the scan script have been performed. At block 808, the system may determine the size of the data corresponding to each quality level. For example, the system may apply a progressive JPEG parser to identify where in the image data the dividing lines between successive scans are located. Using this information and the assignment of particular scans to different image qualities in block 802, the system may determine how much data corresponds to each respective scan. These amounts may be stored in an array (or other suitable structure) at block 810. This array may be used to represent the data lengths in the image message.

Turning to FIG. 8B, a procedure for rendering an image using the intermediate qualities stored in FIG. 8A is described. The logic 850 begins at block 852, which follows from block 676 of FIG. 6B. At block 852, the system determines if the data corresponding to the quality level currently being processed has been fully downloaded. For example, at the start of the procedure, the system will be downloading image data corresponding to the thumbnail quality. If more data remains to be downloaded at the current quality level, then processing may proceed to block 854. Blocks 854-864 generally correspond to blocks 678-686 of FIG. 6B, and the description of these blocks is omitted here to avoid repetition. These blocks are repeatedly performed until the image data for the current quality level finishes downloading over the data stream.

Once the data for the current quality level is finished downloading ("yes" at block 852), processing proceeds to block 866. Here, the system receives parameters describing the state of the network connection (e.g., the network throughput, bandwidth, bitrate, dropped packet rate, etc.). At block 868, the system compares these parameters to predetermined network quality thresholds for the next quality level. For example, if the system has just finished processing for the thumbnail quality, the system may evaluate whether the network connection is good enough to download image data at the low quality.

If so, processing proceeds to block 854, and the system continues to download data chunks from the image data until the next quality level is reached. If not, processing may proceed to block 870, and the system may terminate the data stream with the blob server. Consequently, the system refrains from downloading additional image data for the higher qualities of the image. Thus, the system renders the image at the highest quality downloaded, but can avoid performing large downloads when the network quality is not sufficient.

The embodiments described above may be performed by a messaging architecture, an example of which is next described with reference to FIG. 9.

Messaging Architecture

Figure 9:
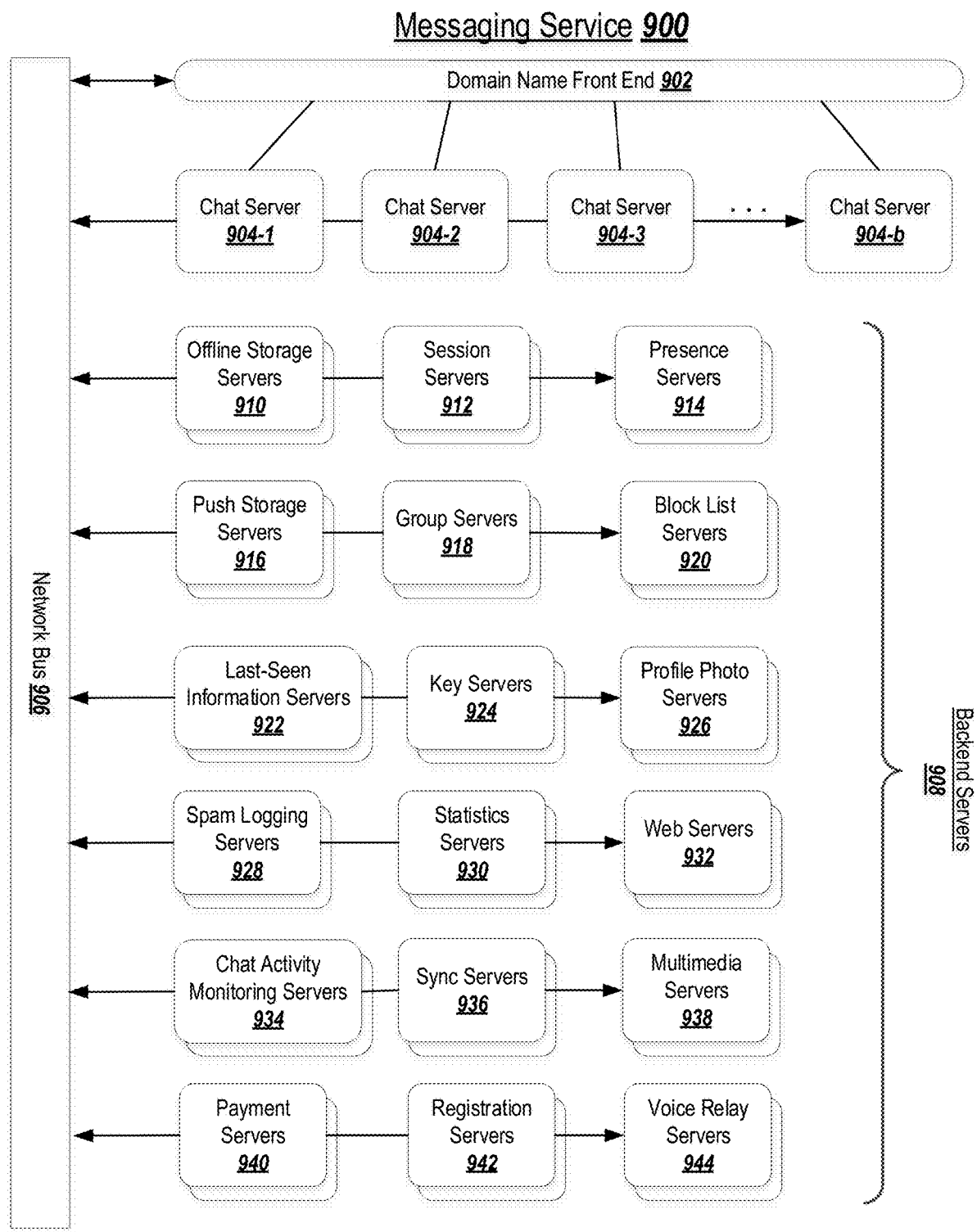
FIG. 9 is a block diagram depicting an example of a system for a messaging service.

FIG. 9 illustrates an embodiment of a plurality of servers implementing various functions of a messaging service 900 suitable for use with exemplary embodiments. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
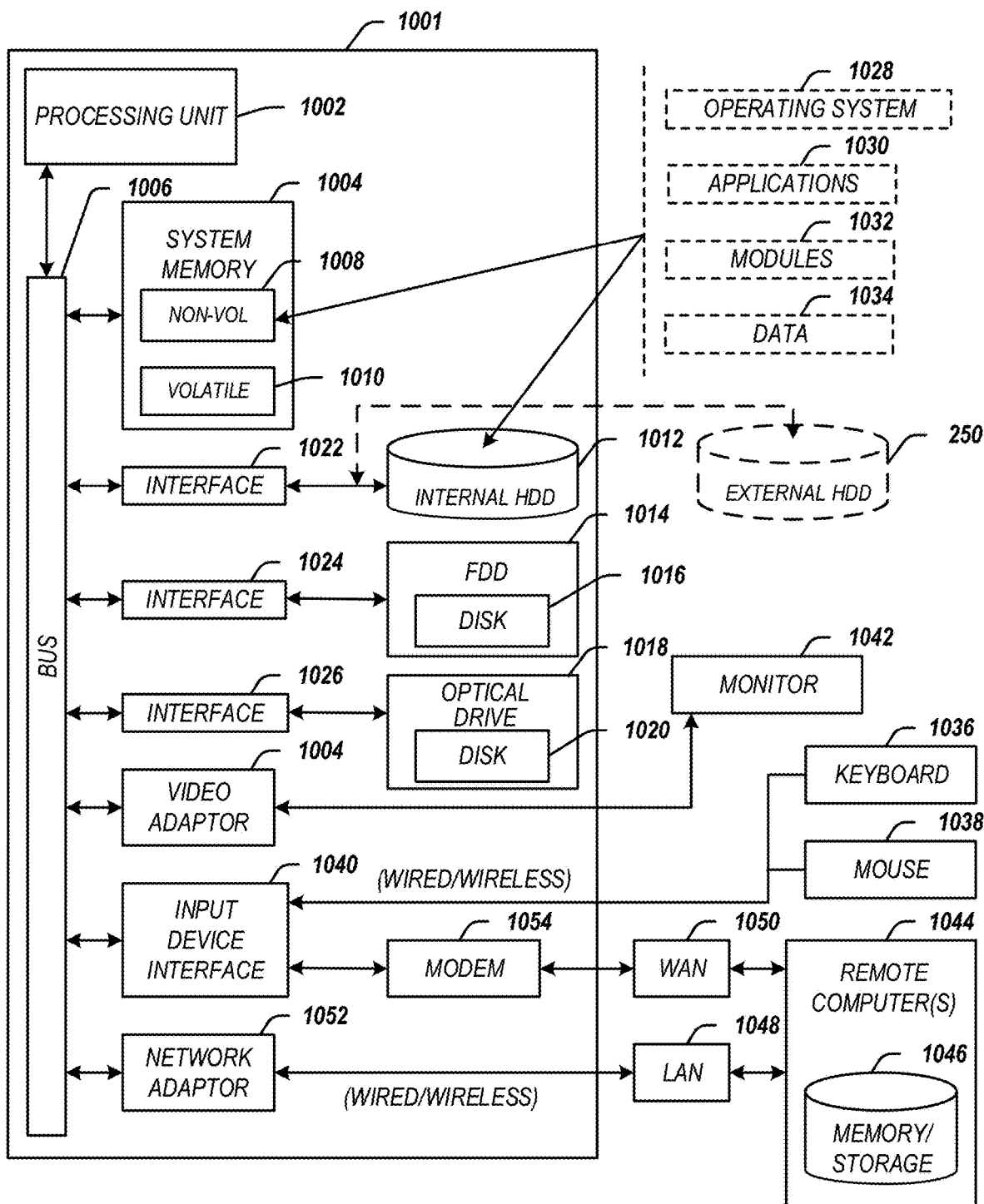
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
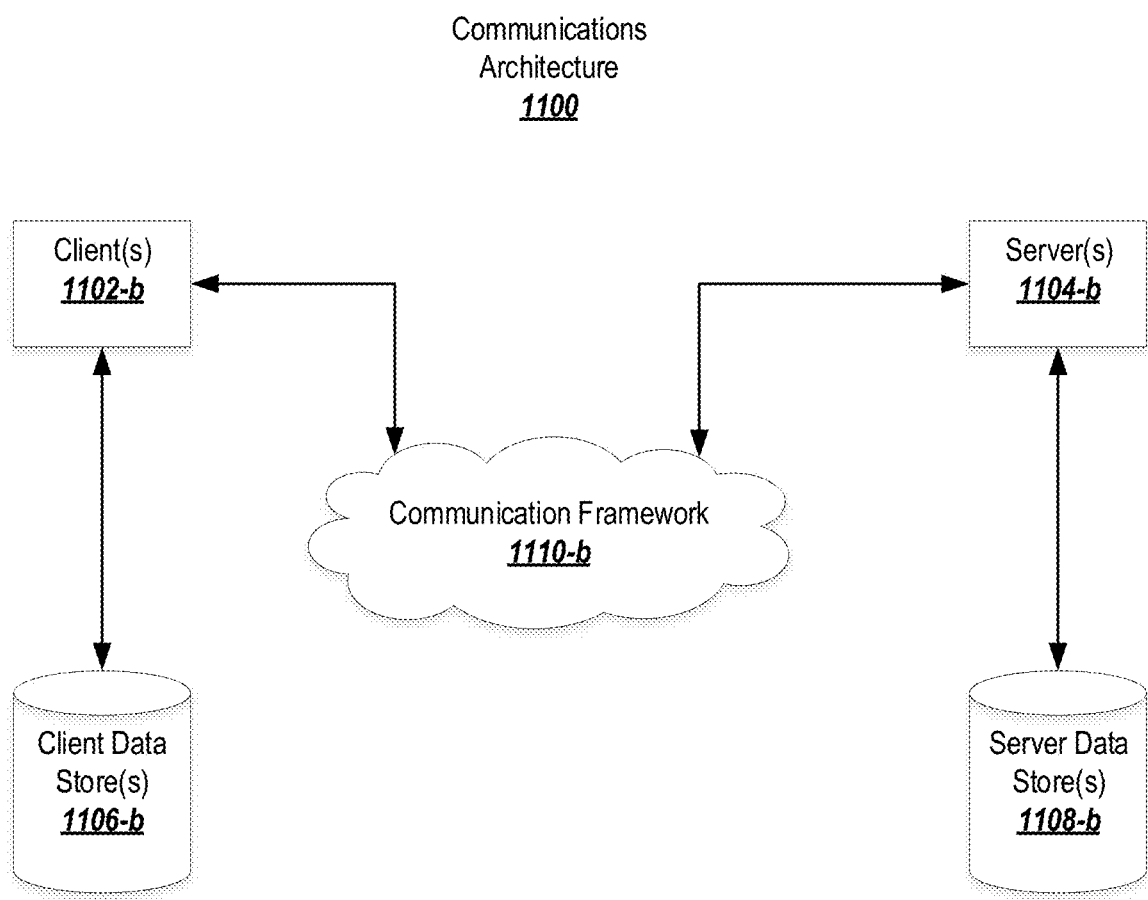
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
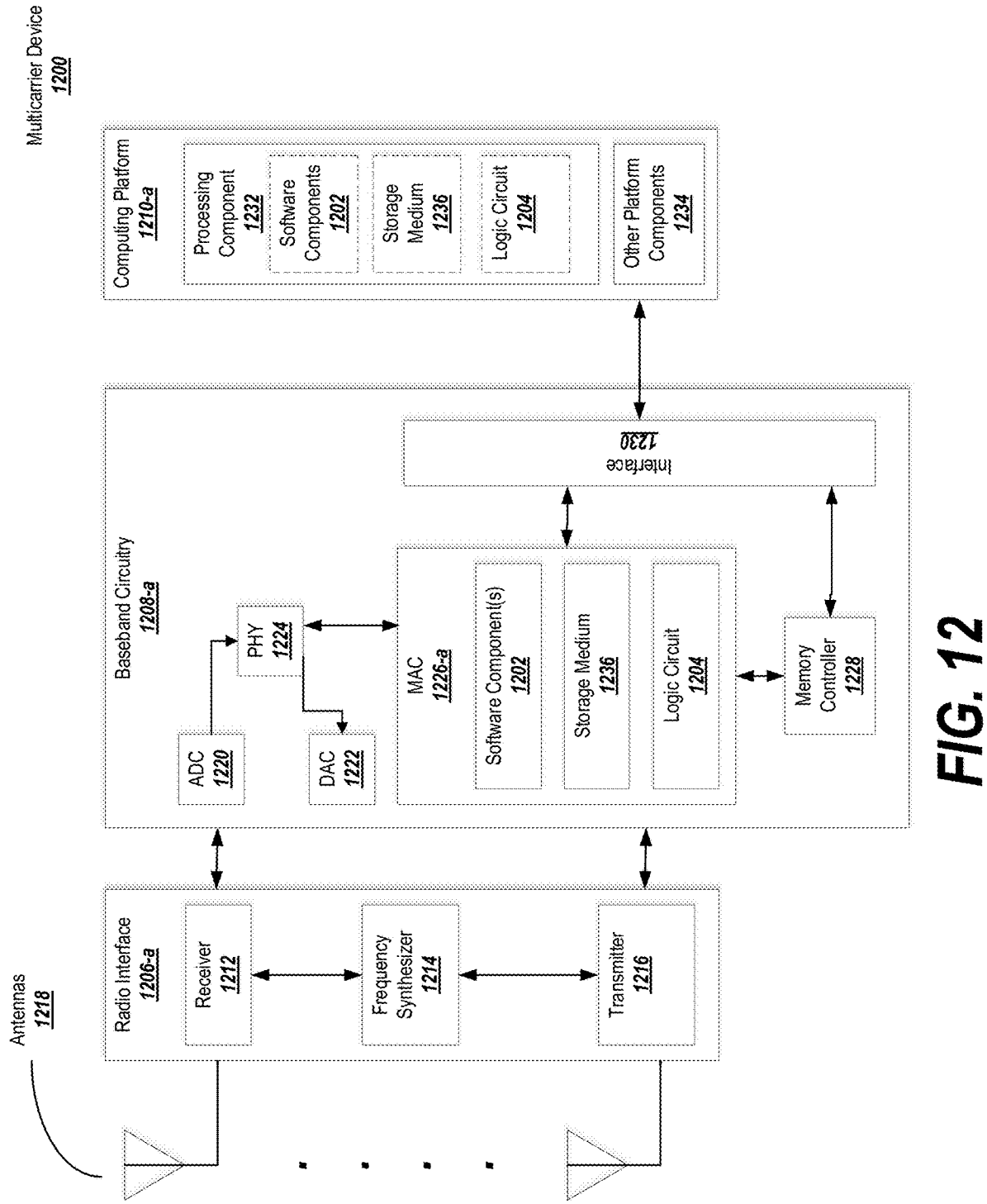
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multicarrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives.

These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   receiving, via an end-to-end encrypted session between a sending device and a receiving device, a message including a reference to an image;
   establishing a connection to a blob store, the blob store holding an encrypted thumbnail of the image and additional encrypted data that, when combined with the encrypted thumbnail, results in a full-quality version of the image;
   retrieving the encrypted thumbnail from the blob store, wherein retrieving the encrypted thumbnail comprises:
      downloading a data chunk including at least some of the encrypted thumbnail; receiving a keyed-hash message authentication code (HMAC) in connection with the data chunk;
      calculating an HMAC over the downloaded data chunk;
      comparing the calculated HMAC to the received HMAC to verify that the encrypted thumbnail has not been altered;
      decrypting the thumbnail; and
      displaying the thumbnail;
   receiving a request to display the full-quality version of the image;
   retrieving the additional encrypted data from the blob store, decrypting the additional data, and combining the decrypted additional data with the thumbnail; and
   displaying the full-quality version of the image.

2. The method of claim 1, wherein retrieving the encrypted thumbnail from the blob store is performed automatically in direct response to receiving the message.

3. The method of claim 1, wherein the encrypted thumbnail and the additional encrypted data are stored together in an image structure, and the message including the reference to the image comprises a location in the image structure that divides the encrypted thumbnail from the additional encrypted data.

4. The method of claim 3, further comprising:
   receiving a request to forward the image to a second recipient; and
   retransmitting the location in the image structure that divides the encrypted thumbnail from the additional encrypted data while refraining from retranscoding the image.

5. The method of claim 1, wherein retrieving the encrypted thumbnail from the blob store and retrieving the additional encrypted data from the blob store are performed together in response to a single request for the image referenced in the message.

6. The method of claim 1, wherein the image is a progressive JPEG.

7. A non-transitory computer readable medium storing instructions configured to cause a processor to:
   receive, via an end-to-end encrypted session between a sending device and a receiving device, a message including a reference to an image;
   establish a connection to a blob store, the blob store holding an encrypted thumbnail of the image and additional encrypted data that, when combined with the encrypted thumbnail, results in a full-quality version of the image;
   retrieve the encrypted thumbnail from the blob store, wherein retrieving the encrypted thumbnail comprises:
      downloading a data chunk including at least some of the encrypted thumbnail; receiving a keyed-hash message authentication code (HMAC) in connection with the data chunk;
      calculating an HMAC over the downloaded data chunk;
      comparing the calculated HMAC to the received HMAC to verify that the encrypted thumbnail has not been altered;
      decrypt the thumbnail; and
      display the thumbnail;
   receive a request to display the full-quality version of the image;
   retrieve the additional encrypted data from the blob store, decrypt the additional data, and combine the decrypted additional data with the thumbnail; and
   display the full-quality version of the image.

8. The medium of claim 7, wherein retrieving the encrypted thumbnail from the blob store is performed automatically in direct response to receiving the message.

9. The medium of claim 7, wherein the encrypted thumbnail and the additional encrypted data are stored together in an image structure, and the message including the reference to the image comprises a location in the image structure that divides the encrypted thumbnail from the additional encrypted data.

10. The medium of claim 9, further storing instructions for:
receiving a request to forward the image to a second recipient; and
retransmitting the location in the image structure that divides the encrypted thumbnail from the additional encrypted data while refraining from retranscoding the image.

11. The medium of claim 7, wherein retrieving the encrypted thumbnail from the blob store and retrieving the additional encrypted data from the blob store are performed together in response to a single request for the image referenced in the message.

12. The medium of claim 7, wherein the image is a progressive JPEG.

13. An apparatus comprising:
a network interface configured to:
receive, via an end-to-end encrypted session between a sending device and a receiving device, a message including a reference to an image; and
establish a connection to a blob store, the blob store holding an encrypted thumbnail of the image and additional encrypted data that, when combined with the encrypted thumbnail, results in a full-quality version of the image; a processor configured to:
retrieve the encrypted thumbnail from the blob store, wherein retrieving the encrypted thumbnail comprises:
downloading a data chunk including at least some of the encrypted thumbnail;
receiving a keyed-hash message authentication code (HMAC) in connection with the data chunk;
calculating an HMAC over the downloaded data chunk; and
comparing the calculated HMAC to the received HMAC to verify that the encrypted thumbnail has not been altered;
decrypt the thumbnail; and
display the thumbnail;
receive a request to display the full-quality version of the image; and
retrieve the additional encrypted data from the blob store, decrypt the additional data, and combine the decrypted additional data with the thumbnail; and
a display configured to display the full-quality version of the image.

14. The apparatus of claim 13, wherein retrieving the encrypted thumbnail from the blob store is performed automatically in direct response to receiving the message.

15. The apparatus of claim 13, wherein the encrypted thumbnail and the additional encrypted data are stored together in an image structure, and the message including the reference to the image comprises a location in the image structure that divides the encrypted thumbnail from the additional encrypted data.

16. The apparatus of claim 15, wherein the network interface is further configured to:
receive a request to forward the image to a second recipient; and
retransmit the location in the image structure that divides the encrypted thumbnail from the additional encrypted data while refraining from retranscoding the image.

17. The apparatus of claim 13, wherein retrieving the encrypted thumbnail from the blob store and retrieving the additional encrypted data from the blob store are performed together in response to a single request for the image referenced in the message.

* * * * *